United States Patent
Koerner et al.

(10) Patent No.: US 7,134,760 B2
(45) Date of Patent: Nov. 14, 2006

(54) OUTSIDE REAR-VIEW MIRROR FOR A MOTOR VEHICLE

(75) Inventors: Gabi Koerner, Wiernsheim (DE); Hugh Robinson, Stuttgart (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 164 days.

(21) Appl. No.: 10/733,755

(22) Filed: Dec. 12, 2003

(65) Prior Publication Data

US 2004/0201911 A1 Oct. 14, 2004

(30) Foreign Application Priority Data

Dec. 12, 2002 (DE) ............................... 102 57 983

(51) Int. Cl.
*G02B 7/182* (2006.01)
*B60R 1/06* (2006.01)

(52) U.S. Cl. ...................................... 359/871; 359/881

(58) Field of Classification Search ............... 359/507, 359/508, 509, 871, 872, 881
See application file for complete search history.

(56) References Cited

U.S. PATENT DOCUMENTS

| | | | | |
|---|---|---|---|---|
| 3,671,005 A * | 6/1972 | Schultz | ........................ | 248/480 |
| 4,394,066 A | 7/1983 | Sharp | | |
| 4,585,316 A | 4/1986 | Knutson et al. | ............ | 350/582 |
| 4,759,620 A | 7/1988 | Sakuma et al. | ............. | 350/604 |
| 4,836,491 A * | 6/1989 | Fimeri | ........................ | 248/549 |
| 5,061,056 A * | 10/1991 | You | ............................ | 359/872 |
| 5,268,797 A | 12/1993 | Santo | ........................ | 359/872 |
| 5,337,188 A * | 8/1994 | do Espirito Santo | ........ | 359/872 |
| 5,483,385 A | 1/1996 | Boddy | | |
| 5,621,577 A * | 4/1997 | Lang et al. | .................. | 359/872 |
| 6,036,325 A * | 3/2000 | Su | ............................. | 359/871 |
| 6,276,805 B1 * | 8/2001 | Home et al. | ................. | 359/841 |
| 6,276,808 B1 * | 8/2001 | Foote et al. | ................. | 359/877 |
| 6,325,518 B1 * | 12/2001 | Whitehead et al. | ......... | 359/841 |
| 6,336,726 B1 * | 1/2002 | Lang et al. | ................. | 359/871 |
| 6,371,620 B1 * | 4/2002 | Lang et al. | ................. | 359/872 |
| 6,598,983 B1 * | 7/2003 | Boddy | ........................ | 359/841 |
| 6,799,856 B1 * | 10/2004 | Foote et al. | ................. | 359/841 |

FOREIGN PATENT DOCUMENTS

| | | |
|---|---|---|
| DE | 33 43 197 | 11/1992 |
| DE | 695 14 933 | 7/2000 |
| GB | 2 130 990 | 6/1984 |
| GB | 2382555 | * 6/2003 |

* cited by examiner

*Primary Examiner*—Ricky D. Shafer
(74) *Attorney, Agent, or Firm*—Crowell & Moring LLP

(57) ABSTRACT

An outside rear-view mirror suitable for a motor vehicle, particularly for a passenger car of the sports car type, is provided with a housing accommodating a mirror glass plate is connected with a carrying device having supporting arms, which carrying device is supported on a body of the passenger car. For optimizing the rear-view mirror construction, the carrying device and the housing are produced separately from one another, free ends of the supporting arms of the carrying device projecting into the housing and being connected with holding consoles of the housing.

17 Claims, 5 Drawing Sheets

OUTSIDE REAR-VIEW MIRROR FOR A MOTOR VEHICLE

This application claims the priority of German Application No. 102 57 983.0 filed on Dec. 12, 2002, the disclosure of which is expressly incorporated by reference herein.

The invention relates to an outside rear-view mirror for a motor vehicle. Certain preferred embodiments relate to an outside review mirror assembly for a passenger car of the sports car type, in the case of which a housing accommodating a mirror glass plate is connected with a carrying device having supporting arms, which carrying device is supported on a body of the passenger car.

An outside rear-view mirror of the initially mentioned type known from British Patent Document GB 2 130 990 (corresponding U.S. Pat. No. 4,585,316) has a housing for a mirror glass plate which is held on a body of a motor vehicle by means of horizontally aligned supporting arms and a fastening plate. The supporting arms and the housing are made of one piece and consist of a plastic material. U.S. Pat. No. 4,759,620 shows a comparable construction.

From U.S. Pat. No. 5,268,797, an outside rear-view mirror of a motor vehicle is known whose housing accommodating a mirror glass plate is provided with a lateral holding device facing a vehicle body. The holding device has a carrying bow which adjoins the housing by means of relatively short arms. In areas, the arms are constructed as rudiments on the housing, a fixing pin and a fastening screw being used for holding the bow on the rudiments.

It is an object of the invention to create an outside rear-view mirror for a motor vehicle, which is distinguished by a simple and reliable construction while offering constructive degrees of freedom.

According to certain preferred embodiments of the invention, this object is achieved by outside rear-view mirror for a motor vehicle, particularly a passenger car of the sports car type, in the case of which a housing accommodating a mirror glass pate is connected with a carrying device having supporting arms, which carrying device is supported on a body of the passenger car, wherein the carrying device and the housing are produced separately from one another, free ends of the supporting arms of the carrying device projecting into the housing and being connected with carrying elements of the housing.

The principal advantages achieved by means of the invention are that the separately produced housing and carrying device, which carrying device has supporting arms, permit a use of materials for these components which corresponds to the requirements. As a result of this design, multiple construction variants can also be implemented. Because of the carrying device and the clear type of connection with the housing, the construction of the outside rear-view mirror can be easily implemented. The housing and the carrying device can also be integrated in a style concept by means of which a particularly aesthetic effect can be achieved. The V-shaped course of the supporting arms according to certain preferred embodiments finally contributes to the fact that an effective supporting of the housing is ensured.

Other objects, advantages and novel features of the present invention will become apparent from the following detailed description of the invention when considered in conjunction with the accompanying drawings.

DETAILED DESCRIPTION OF THE DRAWINGS

Figure 1:
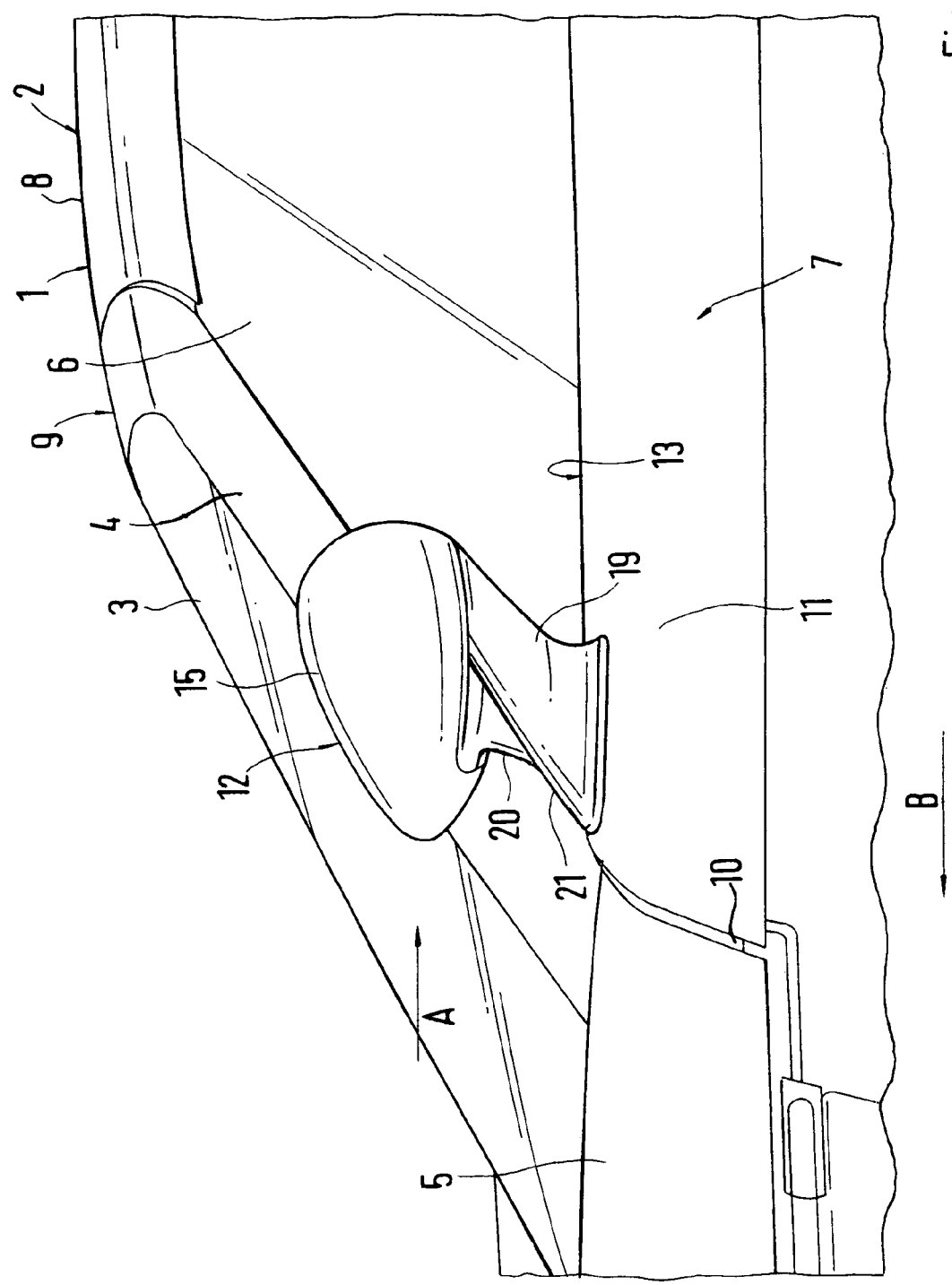
FIG. 1 is a partial lateral view of a passenger car in the area of a windshield frame with an outside rear-view mirror according a to preferred embodiment the invention.
Figure 2:
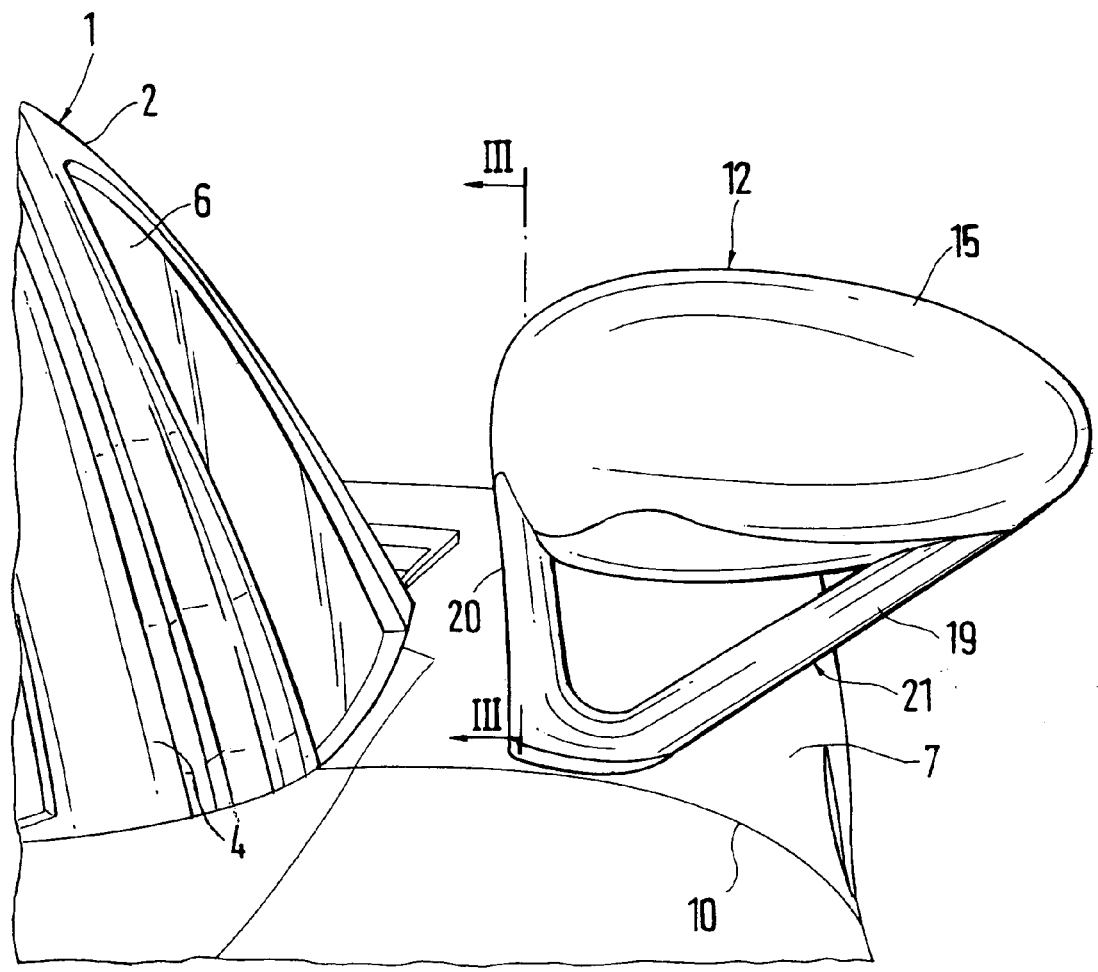
FIG. 2 is a view in the direction of the arrow A of FIG. 1.

In the area illustrated in FIG. 1, a passenger car 1 of the sports car type with a dynamic appearance and superior driving performance has a vehicle body 2 with a frame 4 accommodating the windshield 3, a forward side part 5, a door 7 comprising a lowerable side window pane 6, and a removable roof 8 which extends between a transverse part 9 of the frame 4 and a rollover bar system which is not shown in detail.

Figure 3:
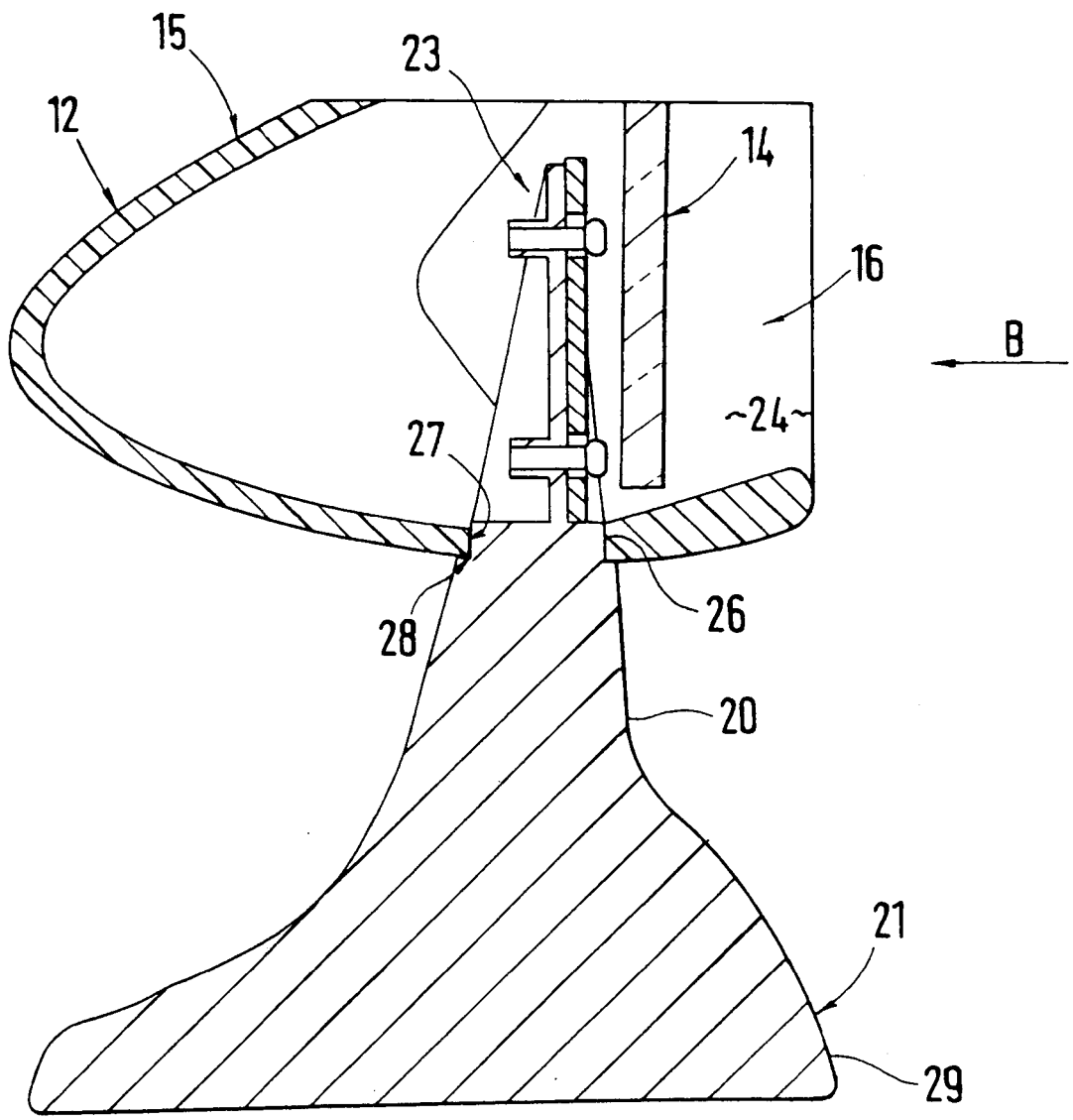
FIG. 3 is a sectional view approximately according to Line III—III of FIG. 2.
Figure 4:
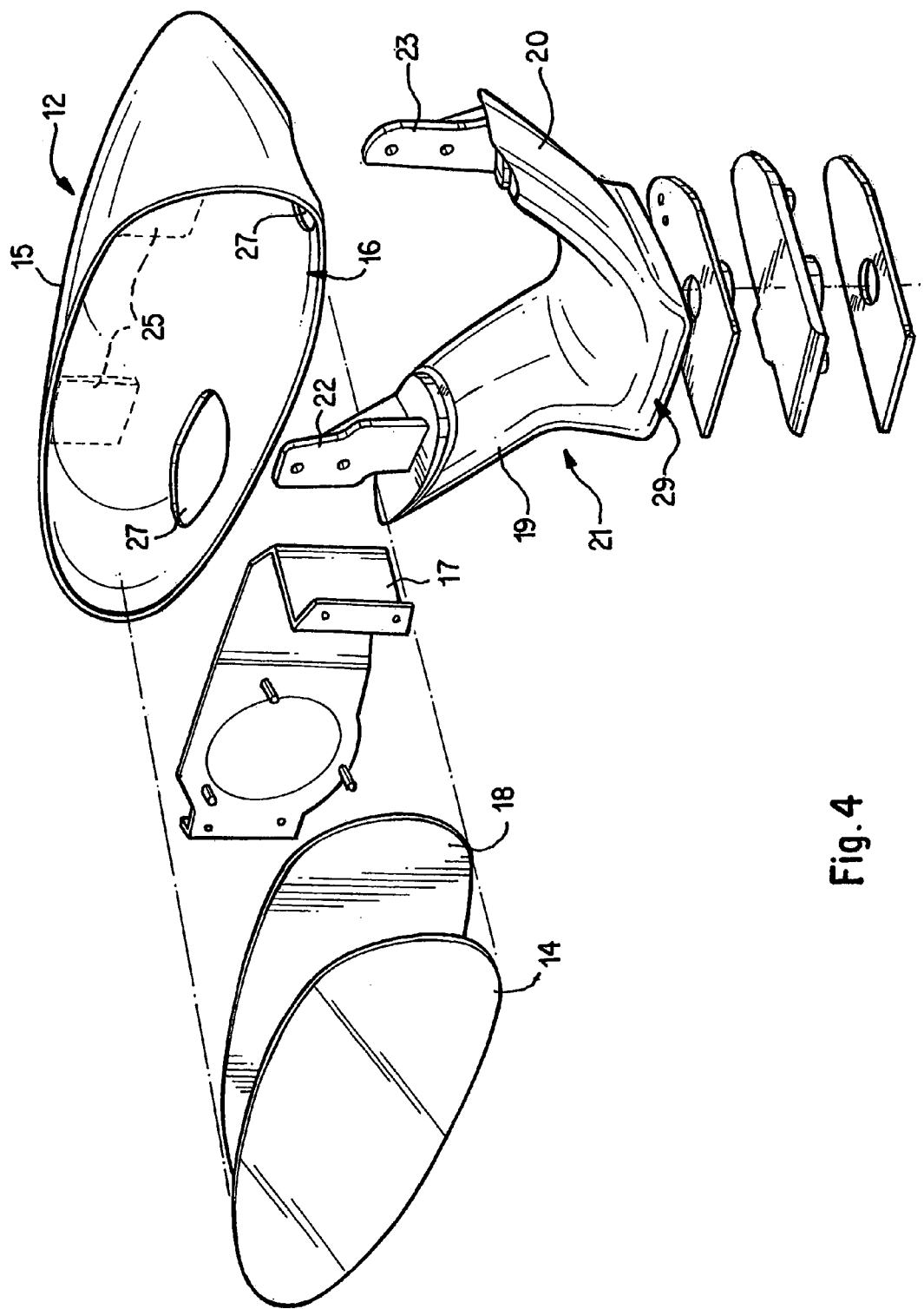
FIG. 4 is an exploded diagonal view from the left front of the outside rear-view mirror of FIGS. 1 and 2.

Adjacent to a joint 10 at an exterior door wall 1, the door 7 carries an outside rear-view mirror 12 which projects upward from a belt line 13 of the vehicle body 2. The outside rear-view mirror 12 has a housing 15 which surrounds a mirror glass plate 14—FIG. 3—housing 15 is comprised of a plastic material or another suitable material, and has the shape of a horizontal bowl and, in the driving direction B, has an aerodynamic or approximately drop-shaped design. By way of a housing opening 16, a console 17, a mirror glass plate carrier 18 and the mirror glass plate 14 are inserted—FIG. 4.

The housing 15 rests on a carrying device 21 which is provided with supporting arms 19 and 20; consisting, for example, of a light-metal alloy; and is connected with the exterior door wall 11 while supporting itself thereon. The carrying device 21 with the supporting arms 19 and 20, and the housing 15 are produced separately from one another on the basis of the above-mentioned material data. In this case, free ends 22 and 23 project into an interior 24 of the housing 15 and are connected with schematically shown carrying elements 25 of the housing 15. The carrying elements 25 are produced in one piece with the housing 15. By means of a collar 26, each supporting arm, for example, 19, penetrates an opening 27 in the housing 15, and the housing 15 rests on a shoulder 28 which bounds the collar 26.

Figure 5:
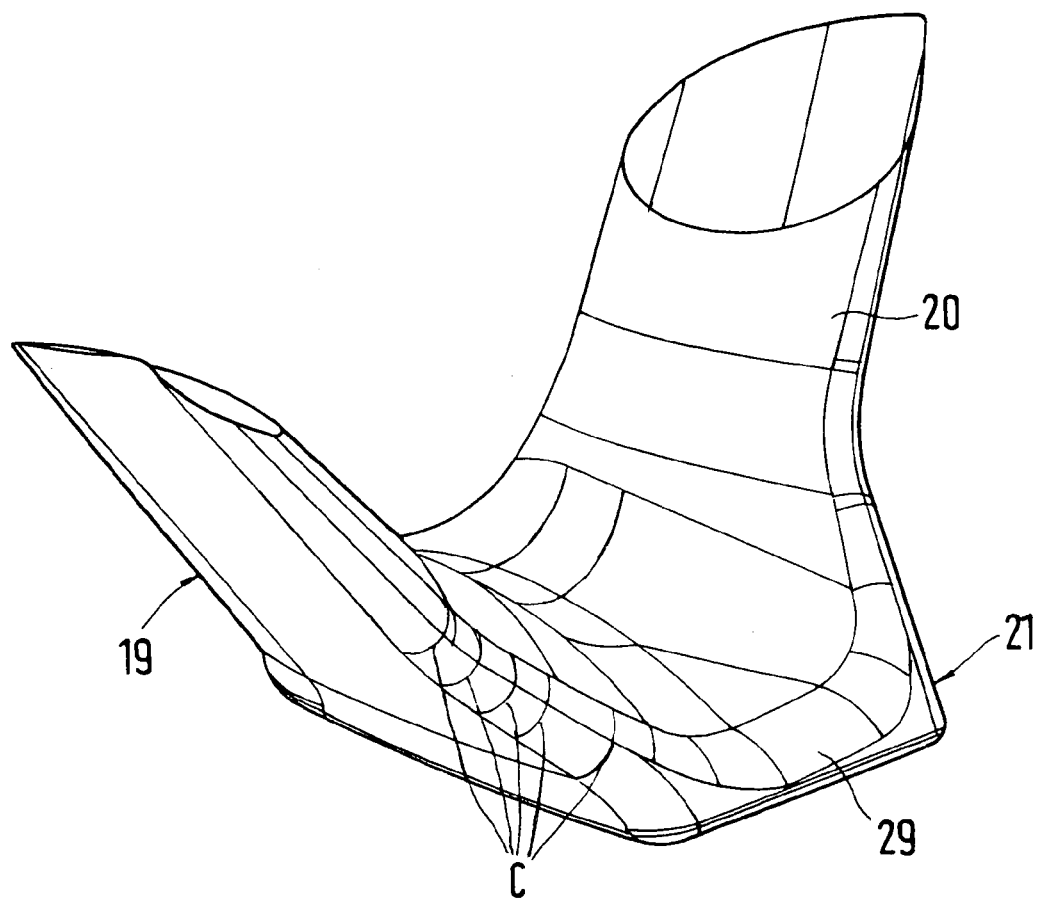
FIG. 5 is a diagonal view of a carrying device of the outside rear-view mirror of FIGS. 1–4.

So that the housing 15 has a functionally appropriate hold on the carrying device 21, the relatively upright supporting arms 19 and 20 have a V-shaped course from a base section 29 of the carrying device 21 to the housing 15. Finally, viewed in the driving direction B, the supporting arms 19 and 20 have an aerodynamic shape—FIG. 5—, as illustrated at letter C.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Outside rear-view mirror for a motor vehicle comprising a housing accommodating a mirror glass plate and connected with a carrying device having two supporting arms which have a V-shaped course from a base section of the carrying device to the housing, said carrying device is supported on a body of the motor vehicle, wherein free ends of the supporting arms of the carrying device project into the housing, wherein each supporting arm has a collar which penetrates one of several separate openings in the housing and the housing rests in the area of each opening on a shoulder bounding the collar, wherein the free ends of the supporting arms are connected with carrying elements of the housing, and wherein the carrying elements are disposed behind the mirror glass plate.

2. Outside rear-view mirror according to claim 1, wherein the housing is made of a plastic material.

3. Outside rear-view mirror according to claim 2, wherein the carrying elements and the housing are produced from one piece.

4. Outside rear-view mirror according to claim 1, wherein the carrying device consists of metal.

5. Outside rear-view mirror according to claim 4, wherein the carrying elements and the housing are produced from one piece.

6. Outside rear-view mirror according to claim 4, wherein the metal is a light-metal diecasting.

7. Outside rear-view mirror according to claim 1, wherein the supporting arms have an aerodynamic shape.

8. Outside rear-view mirror according to claim 7, wherein the carrying elements and the housing are produced from one piece.

9. Outside rear-view mirror according to claim 1, wherein the carrying elements and the housing are produced from one piece.

10. Outside rear-view mirror according to claim 1, wherein the motor vehicle is a passenger car of a sports car type.

11. Outside rear-view mirror according to claim 1, wherein the carrying device and the housing are produced separately from one another.

12. Outside rear-view mirror assembly for a passenger car comprising:

a mirror housing, a mirror glass plate supported in the mirror housing, a carrying device including two supporting arms, which has a substantially V-shape configuration from a base section of the carrying device to the housing, attachable with the housing, said carrying device being attachable in use to a body part of the passenger car, wherein the mirror housing and the carrying device are formed of different materials, wherein each supporting arm has a collar which penetrates one of several separate openings in the mirror housing, wherein the mirror housing rests in the area of each opening on a shoulder bounding the collar, wherein free ends of the supporting arms project into the mirror housing and are connected with carrying elements of the mirror housing, and wherein the carrying elements are disposed behind the mirror glass plate.

13. The mirror assembly according to claim 12, wherein the housing is made of a plastic material.

14. The mirror assembly according to claim 13, wherein the carrying device consists of metal.

15. The mirror assembly according to claim 14, wherein the metal is a light-metal diecasting.

16. The mirror assembly according to claim 12, wherein the carrying device consists of metal.

17. The mirror assembly according to claim 16, wherein the metal is a light-metal diecasting.

* * * * *